United States Patent Office 3,070,424
Patented Dec. 25, 1962

3,070,424
PROCESS FOR THE CONVERSION OF AMMONIUM IMIDO DISULFONATE INTO AMMONIUM AMIDO SULFONATE
Erich Korinth, Hofheim, Taunus, and Erhard Heubach, Kriftel, Taunus, Germany, assignors to Farbwerke Hoechst Aktiengesellschaft vormals Meister Lucius & Brüning, Frankfurt am Main, Germany, a corporation of Germany
No Drawing. Filed Jan. 4, 1961, Ser. No. 80,534
Claims priority, application Germany Jan. 7, 1960
6 Claims. (Cl. 23—114)

The object of the present invention is a process for the conversion of ammonium imido disulfonate or of a mixture of ammonium imido disulfonate and at least one compound from the group consisting of ammonium amido sulfonate, ammonium sulfate, ammonium bisulfate and sulfamide, into ammonium amido sulfonate by causing aqueous ammonia to act upon said compounds under superatmospheric pressure and at an elevated temperature.

There are known several processes for preparing amido sulfonic acid or the ammonium salt thereof. The direct conversion of ammonia with sulfur trioxide in the gaseous phase is the simplest process that can be carried out with cheap raw materials and little expenditure for apparatus. However, there is formed in this process, in addition to the desired ammonium amido sulfonate, also a large amount of the undesired ammonium imido disulfonate, generally in amounts exceeding 50 percent. Depending on the chosen reaction conditions, there is also formed a small amount of ammonium sulfate or bisulfate as well as smaller portions of sulfamide and other sulfur-nitrogen compounds. The product obtained in this process which consists of the constituents mentioned above is available as a white, pulverulent to dust-like and voluminous material.

It is true that by altering the reaction conditions of this process the proportion of the ammonium amido sulfonate and ammonium imido disulfonate can be varied, but only to a certain limit so that, in addition to the desired ammonium amido sulfonate, there is always obtained a considerable portion of the undesired ammonium imido disulfonate.

As is well-known, ammonium amido sulfonate splits off ammonia at an elevated temperature and is converted into ammonium imido disulfonate according to the equation

$$2H_2\text{—}SO_3NH_4 \rightarrow HN(SO_3NH_4)_2 + NH_3$$

It has already been described that this reaction also follows the reverse course under an elevated ammonia pressure and at an elevated temperature. For example, the ammonium imido disulfonate can, under suitable reaction conditions, be converted into ammonium amido sulfonate with liquid or gaseous ammonia under superatmospheric pressure and at an elevated temperature. Such a treatment of the ammonium imido disulfonate, especially the treatment of the mixture of ammonium amido sulfonate and ammonium imido disulfonate formed in the conversion of $NH_3$ and $SO_3$ in the gaseous phase with gaseous or liquid ammonia is, however, connected with considerable difficulties for technical reasons.

Now we have found a process for the conversion of ammonium imido disulfonate that can be carried out in a simple manner, if desired in mixture with ammonium amido sulfonate and/or ammonium sulfate or bisulfate and/or sulfamide and/or further sulfur and nitrogen compounds into the ammonium amido sulfonate by causing ammonia to act upon the aforesaid compounds under superatmospheric pressure and at an elevated temperature, which process consists in treating the initial product in a closed reaction chamber resistant to pressure with an aqueous solution of ammonia at temperatures above 100° C. and under the vapor pressure of the reaction mixture prevailing.

It was found that, in order to carry out the process of this invention, there must be used aqueous solutions of ammonia having a content of at least 10 percent by weight of ammonia. It was found to be especially advantageous to use aqueous solutions of ammonia having a content of about 20 to about 50 percent by weight of ammonia. Although the ammonium imido disulfonate is already converted into ammonium amido sulfonate when applying an aqueous solution of ammonia of 10 percent strength, the yields, according to the lower concentration, are substantially lower than in the case of using aqueous solutions of ammonia of about 20 to 50 percent strength. The process according to the invention can also be carried out with aqueous solutions of ammonia having a content of $NH_3$ that is higher than 50 percent which, however, has no economic advantages.

It has, furthermore, proved to be particularly advantageous to carry out this reaction at a temperature of about 160° C. to about 190° C. The reaction proper can already be carried out at a temperature of 100° C., but the yields are substantially lower than in the case of effecting the reaction within the last-mentioned temperature range. The process may, however, also be carried out at temperatures above 190° C., the upper temperature limit being determined by the stability of the initial and final products and by the stability of the pressure vessel used since, as is well-known, the pressure in the closed reaction vessel increases with the rising temperature.

The process according to the invention has proved to be advantageous especially for the use of the ammonium amido sulfonate of low concentration obtained in the known direct conversion of ammonia with sulfur trioxide in the gaseous phase, said ammonium amido sulfonate containing, in general, more than 50 percent by weight of ammonium imido disulfonate and, in addition, small portions of ammonium sulfate or bisulfate, sulfamide and other sulfur-nitrogen compounds, for the conversion into an ammonium amido sulfonate of high concentration containing traces only of the undesirable ammonium imido disulfonate. The afore-mentioned compounds present in relatively small amounts, such as ammonium sulfate or bisulfate, sulfamide and other sulfur-nitrogen compounds do not disturb the further treatment according to the invention of the ammonium amido sulfonate of low concentration since the compounds as such are not subject to conversions to a noticeable extent.

The ammonium amido sulfonate obtained by the aforesaid process is, according to the process of the invention, dissolved in aqueous concentrated ammonia and then immediately subjected to the reaction conditions according to the invention. When working according to this method, the difficulties arising when treating the voluminous, pulverulent mixture according to the known conversion process with gaseous or liquid ammonia are avoided and an ammonium amido sulfonate of high concentration is obtained that exhibits very favorable properties, especially as a primary product for further conversions, for example with mineral acid into the free amido sulfonic acid.

The process according to the invention is carried out in a closed reaction space resisting pressure, for example in a sealed tube or in an autoclave in order to establish the superatmospheric pressure necessary for the reaction which is determined by the temperature applied, the volume of the reaction space and the concentrations of the reactants.

The process of the invention can also be carried out continuously in flow pressure tubes.

The following examples show that the process of the present invention, as compared with the known conversion processes with liquid and gaseous ammonia, can be effected in a much simpler manner, as well as the favorable conversion yields obtained by this process. The examples serve to illustrate the invention, but they are not intended to limit it thereto:

Example 1

Two grams of ammonium imido disulfonate (of 98.1% strength) were mixed with 8 cc. of aqueous ammonia of 45% strength, heated immediately to 190°±5° C. in a sealed tube (capacity: 60 cc.) and maintained under these conditions for 8 hours. The sealed tube was situated in a pressure vessel containing nitrogen having a pressure of about 60 to 65 atmospheres gage in order to compensate the pressure prevailing in the sealed tube. When the reaction was complete, the reaction mixture was cooled, evaporated to dryness on a water bath, and the solid product was analyzed. The yield amounted to 74.2% of $H_2N$—$SO_3NH_4$, calculated on the ammonium imido disulfonate applied.

Example 2

0.2 kilogram of a mixture containing 38.8% of ammonium amido sulfonate, 51.7% of ammonium imido disulfonate and 2.85% of free ammonia was mixed with 0.8 liter of aqueous ammonia of 25% strength, heated immediately in an autoclave (capacity: 4.5 liters) to 180°±5° C. and kept at this temperature for six hours. The autoclave was equipped with an open glass inset (capacity: 1.8 liters) in order to avoid corrosion by the salt solution and possible influences of the metal compounds forming in the course of the reaction. The further treatment of the reaction product took place as described in Example 1. The yield was 82.6% of $H_2N$—$SO_3NH_4$, calculated on the mixture applied.

Example 3

1.5 kilograms of a mixture containing 40.5% of ammonium amido sulfonate, 51.7% of ammonium imido disulfonate and 3.74% of free ammonia were mixed with 6 liters of an aqueous ammonia of 45% strength, heated immediately in an autoclave (capacity: 45 liters) provided with an open glass inset to 190°±5° C. and kept at this temperature for 3 hours. The further treatment of the reaction product took place as described in Example 1.

The yield was 88.3% of $H_2N$—$SO_3NH_4$, calculated on the mixture applied.

Example 4

2 grams of a mixture containing 38.8% of ammonium amido sulfonate, 51.7% of ammonium imido disulfonate and 2.85% of free ammonia were mixed with 8 cc. of an aqueous ammonia of 35% strength, heated immediately in a sealed tube (capacity: 60 cc.) to 167°±5° C. and maintained under these conditions for 6 hours. The sealed tube was situated in a pressure vessel containing nitrogen having a pressure of about 60 to 65 atmospheres gage in order to compensate the pressure prevailing in the sealed tube. After the reaction was complete, the reaction mixture was allowed to cool, evaporated to dryness on a water bath and the solid product was analyzed. The yield was 68.4% of $H_2N$—$SO_3NH_4$, calculated on the mixture applied.

Example 5

2 grams of a mixture of 38.8% of ammonium amido sulfonate, 51.7% of ammonium imido disulfonate and 2.85% of free ammonia were mixed with 8 cc. of an aqueous ammonia of 25% strength, heated immediately in a sealed tube (capacity: 60 cc.) to 190°±5° C. and maintained under these conditions for 6 hours. The sealed tube was situated in a pressure vessel containing nitrogen having a pressure of about 60 to 65 atmospheres gage in order to compensate the pressure prevailing in the sealed tube. After the reaction was complete, the reaction mixture was allowed to cool, evaporated to dryness on a water bath, and the solid product was analyzed. The yield was 85.5% of $H_2N$—$SO_3NH_4$, calculated on the mixture applied.

We claim:
1. A process for the conversion of ammonium imido disulfonate into ammonium amido sulfonate by causing ammonia to act upon the ammonium imido disulfonate under pressure and at an elevated temperature, which comprises treating the ammonium imido disulfonate in a closed reaction chamber that is resistant to pressure with an aqueous solution of ammonia containing at least 10 percent and up to about 50 percent by weight of ammonia at temperatures above 100° C. under the prevailing vapor pressure of the reaction mixture.

2. A process as claimed in claim 1, wherein an aqueous solution of ammonia having a content of about 20 to about 50 percent by weight of ammonia is applied.

3. A process as claimed in claim 1, wherein the treatment of the ammonium imido disulfonate with the aqueous solution of ammonia takes place at temperatures within the range of about 160° C. to about 190° C.

4. A process for the conversion of ammonium imido disulfonate in admixture with at least one compound from the group consisting of ammonium amido sulfonate, ammonium sulfate, ammonium bisulfate and sulfamide into ammonium amido sulfonate under pressure and at an elevated temperature, wherein the mixture is treated in a closed reaction chamber resistant to pressure with an aqueous solution of ammonia containing at least 10 percent and up to about 50 percent by weight of ammonia at temperatures above 100° C. and under the prevailing vapor pressure of the reaction mixture.

5. A process as claimed in claim 4, wherein an aqueous solution of ammonia having a content of about 20 to about 50 percent by weight of ammonia is applied.

6. A process as claimed in claim 4, wherein the treatment of the mixture with the aqueous solution of ammonia takes place at temperatures within the range of about 160° C. to about 190° C.

References Cited in the file of this patent
UNITED STATES PATENTS 2,715,563     Robinson et al. _____ Aug. 16, 1955